(No Model.)
F. DE CONINCK & E. C. BURR.
PROCESS OF EXTRACTING SUGAR FROM CANE.
No. 514,431. Patented Feb. 6, 1894.
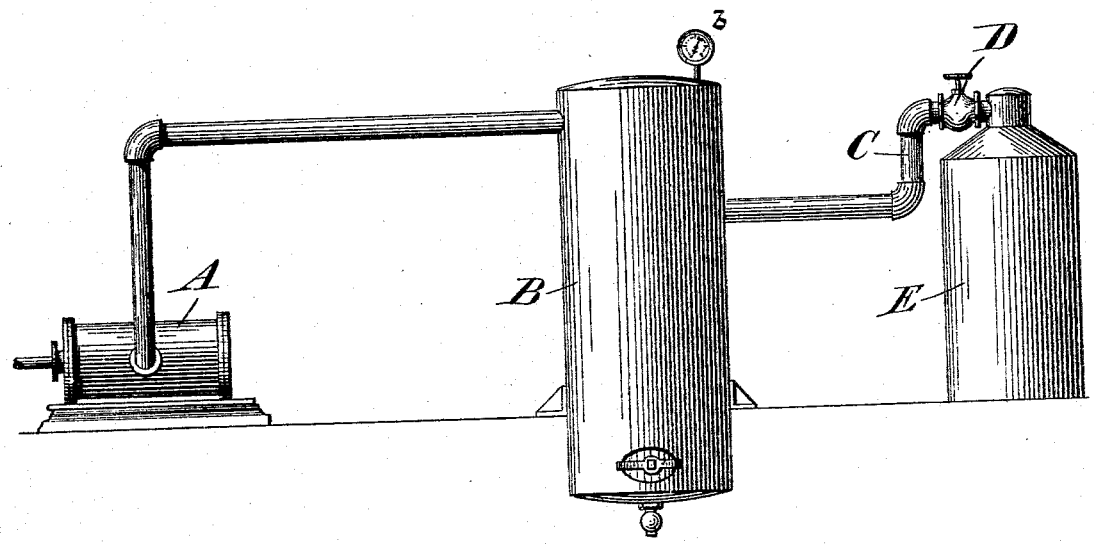

United States Patent Office.

FRANK DE CONINCK AND EDMUND C. BURR, OF SAN FRANCISCO, CALIFORNIA.

PROCESS OF EXTRACTING SUGAR FROM CANE.

SPECIFICATION forming part of Letters Patent No. 514,431, dated February 6, 1894.

Application filed May 5, 1893. Serial No. 473,135. (No specimens.)

*To all whom it may concern:*

Be it known that we, FRANK DE CONINCK, residing at 102 Ellis street, and EDMUND COFFIN BURR, residing at 1722 Vallejo street, San Francisco, county of San Francisco, State of California, citizens of the United States, have invented a certain new and useful process of extracting sugar from beets, cane, or sorghum by submitting the fresh slices while in the diffuser and before any other treatment, to the powerful action of a high vacuum as a preparatory treatment in the diffusion process, of which the following is a specification.

Heretofore in the process of diffusion of sliced beets, cane or sorghum, a twofold loss of sugar has occurred; first, by spontaneous fermentation in the juice in the diffusers, caused by the presence of air and a favorable temperature; second, by the resistance which the interposed air confined within the cells of beets, cane or sorghum, offers, to a certain extent, to the dialytic action of the diffusion process, thus preventing the thorough extraction of the sugar contained therein. The first loss is made evident by the spontaneous formation of foam in the juice and the second by the quantity of sugar remaining in the pulp ejected from the diffusers, and which seldom contains less than four tenths of one per cent. and sometimes exceeds one per cent. of sugar, on the weight of the beets, cane or sorghum worked.

The object of our invention is to do away with this twofold loss and at the same time increase the working capacity of the battery by submitting the fresh slices contained in the leading closed diffuser, and before any other treatment, to the energetic action of a high vacuum, and the degree of vacuum desirable to be employed is one of about twenty-eight [28] inches, and the higher the better, which by suddenly sucking out the interposed air confined within the cells, impairs their cohesion, ruptures and disintegrates them and leaves them prepared to give up more rapidly and completely the sugar contained therein when subjected to the dialyzing action of the weaker and weaker solutions and finally pure water of the diffusion process, and all air being removed instantaneous fermentation can no longer take place in the juice. In fact no more foam is to be found on top of the juice and the exhausted slices contain only about five-hundredths of one per cent. of sugar on the weight of the beets, cane or sorghum worked. In addition the application of a high vacuum in the manner set forth promotes economy of steam used for heating the juice to the required temperature and by its suction accelerates the circulation of juice in the diffusion battery and prevents stoppages.

To carry our invention into effect, we secure the advantages above detailed by an apparatus such as shown in the accompanying drawing in which we obtain a high vacuum by an appropriate pump A operated either by steam or other device and connected with the receiver B, a vessel of about twice the capacity of the diffuser in use, and provided with a vacuum gage $b$, air and outlet valves or cocks, a manhole and two openings, one connected with the pump and the other with an intermediate pipe C, which, in turn, is connected by a short pipe and valve D with each diffuser. The valve D is placed within easy reach of the workman operating the battery. By means of the valve D and the intermediate pipe C, the receiver B is connected at will with the diffuser E.

The arrangement of the apparatus may vary, but we have adopted the method shown, because it answers practically and economically our purposes, no special man being required for operating it, and the valve or cock D by being opened during a few moments and then closed, is sufficient for securing the benefit of our new process.

We are aware that in the preserving of fruits and vegetables it is not new to exhaust the air as a preliminary step to the admission of the preservative material, or to remove foul odors from drugs, vegetables, &c., by exhaustion.

Having fully described our invention, what we desire to claim and secure by Letters Patent is—

In the process of extracting the juice from freshly sliced beets cane and sorghum by diffusion, the preliminary step of exhausting the air from the first vessel of the series before the admission of water or other liquid, whereby the expansion of air in the cells of the sugar containing material destroys their structure and facilitates the removal of the juices as set forth.

FRANK DE CONINCK.
E. C. BURR.

Witnesses:
JAMES L. KING,
JOHN T. YOUNG.